US008086700B2

(12) United States Patent
Davis et al.

(10) Patent No.: US 8,086,700 B2
(45) Date of Patent: Dec. 27, 2011

(54) REGION AND DURATION UNIFORM RESOURCE IDENTIFIERS (URI) FOR MEDIA OBJECTS

(75) Inventors: Marc E. Davis, San Francisco, CA (US); David A. Shamma, San Francisco, CA (US); Ronald Martinez, San Francisco, CA (US); Christopher T. Paretti, San Francisco, CA (US); Joseph O'Sullivan, Sunnyvale, CA (US); Christopher W. Higgins, Portland, OR (US); Athellina Athsani, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 146 days.

(21) Appl. No.: 12/182,111

(22) Filed: Jul. 29, 2008

(65) Prior Publication Data

US 2010/0030870 A1    Feb. 4, 2010

(51) Int. Cl.
*G06F 15/16* (2006.01)
(52) U.S. Cl. ...................................... 709/219; 709/217
(58) Field of Classification Search .................. 709/219, 709/217
See application file for complete search history.

(56) References Cited

U.S. PATENT DOCUMENTS

| 5,446,891 | A | 8/1995 | Kaplan et al. |
| 5,493,692 | A | 2/1996 | Theimer et al. |
| 5,583,763 | A | 12/1996 | Atcheson et al. |
| 5,651,068 | A | 7/1997 | Klemba et al. |
| 5,761,662 | A | 6/1998 | Dasan |
| 5,794,210 | A | 8/1998 | Goldhaber et al. |
| 5,835,087 | A | 11/1998 | Herz et al. |
| 6,014,638 | A | 1/2000 | Burge et al. |
| 6,021,403 | A | 2/2000 | Horvitz et al. |
| 6,047,234 | A | 4/2000 | Cherveny et al. |
| 6,098,065 | A | 8/2000 | Skillen et al. |
| 6,112,181 | A | 8/2000 | Shear et al. |
| 6,157,924 | A | 12/2000 | Austin |
| 6,266,667 | B1 | 7/2001 | Olsson |
| 6,314,365 | B1 | 11/2001 | Smith |
| 6,502,033 | B1 | 12/2002 | Phuyal |
| 6,571,279 | B1 | 5/2003 | Herz et al. |

(Continued)

FOREIGN PATENT DOCUMENTS

KR    1020000036897    7/2000

(Continued)

OTHER PUBLICATIONS

Almieda, R.B. et al. "A Community-Aware Search Engine," WWW2004, New York., NY, May 17-22, 2004, pp. 413-421.

(Continued)

*Primary Examiner* — Kenny Lin
(74) *Attorney, Agent, or Firm* — James J. DeCarlo; Greenberg Traurig, LLP

(57) ABSTRACT

A method for providing a portion of a media object to a user is provided. The method includes receiving a URI associated with a media object. The URI indicates a portion of the media object. The method further includes determining the portion of the media object indicated by the URI. The method also includes providing the portion of the media object to a user. Furthermore, a system for providing a portion of a media object to a user is provided. The system includes a memory, logic for receiving a URI associated with a media object, and a processor. The processor is for determining the portion of the media object indicated by the URI, and providing the portion of the media object to a user.

15 Claims, 6 Drawing Sheets

U.S. PATENT DOCUMENTS

| | | |
|---|---|---|
| 6,601,012 B1 | 7/2003 | Horvitz et al. |
| 6,662,195 B1 | 12/2003 | Langseth et al. |
| 6,694,316 B1 | 2/2004 | Langseth et al. |
| 6,701,315 B1 | 3/2004 | Austin |
| 6,741,980 B1 | 5/2004 | Langseth et al. |
| 6,757,661 B1 | 6/2004 | Blaser et al. |
| 6,813,501 B2 | 11/2004 | Kinnunen et al. |
| 6,842,761 B2 | 1/2005 | Diamond et al. |
| 6,850,252 B1 | 2/2005 | Hoffberg |
| 6,853,913 B2 | 2/2005 | Cherveny et al. |
| 6,853,982 B2 | 2/2005 | Smith et al. |
| 6,904,160 B2 | 6/2005 | Burgess |
| 6,961,660 B2 | 11/2005 | Underbrink et al. |
| 6,985,839 B1 | 1/2006 | Motamedi et al. |
| 7,010,492 B1 | 3/2006 | Bassett et al. |
| 7,058,508 B2 | 6/2006 | Combs et al. |
| 7,062,510 B1 | 6/2006 | Eldering |
| 7,065,345 B2 | 6/2006 | Carlton et al. |
| 7,069,308 B2 | 6/2006 | Abrams |
| 7,073,129 B1 | 7/2006 | Robarts et al. |
| 7,110,776 B2 | 9/2006 | Sambin |
| 7,149,696 B2 | 12/2006 | Shimizu et al. |
| 7,194,512 B1 | 3/2007 | Creemer et al. |
| 7,203,597 B2 | 4/2007 | Sato et al. |
| 7,219,013 B1 | 5/2007 | Young et al. |
| 7,236,969 B1 | 6/2007 | Skillen et al. |
| 7,254,581 B2 | 8/2007 | Johnson et al. |
| 7,257,570 B2 | 8/2007 | Riise et al. |
| 7,343,364 B2 | 3/2008 | Bram et al. |
| 7,437,312 B2 | 10/2008 | Bhatia et al. |
| 7,451,102 B2 | 11/2008 | Nowak |
| 7,461,168 B1* | 12/2008 | Wan .............................. 709/245 |
| 7,522,995 B2 | 4/2009 | Nortrup |
| 7,584,215 B2 | 9/2009 | Saari et al. |
| 7,624,104 B2 | 11/2009 | Berkhin et al. |
| 7,634,465 B2 | 12/2009 | Sareen et al. |
| 7,657,907 B2 | 2/2010 | Fennan et al. |
| 7,769,745 B2 | 8/2010 | Naaman |
| 7,865,308 B2 | 1/2011 | Athsani |
| 2001/0013009 A1 | 8/2001 | Greening et al. |
| 2001/0047384 A1 | 11/2001 | Croy |
| 2002/0014742 A1 | 2/2002 | Conte et al. |
| 2002/0023230 A1 | 2/2002 | Bolnick et al. |
| 2002/0054089 A1 | 5/2002 | Nicholas |
| 2002/0065844 A1 | 5/2002 | Robinson et al. |
| 2002/0069218 A1 | 6/2002 | Sull et al. |
| 2002/0099695 A1* | 7/2002 | Abajian et al. .................... 707/3 |
| 2002/0112035 A1 | 8/2002 | Carey |
| 2002/0133400 A1 | 9/2002 | Terry et al. |
| 2002/0138331 A1 | 9/2002 | Hosea et al. |
| 2002/0152267 A1 | 10/2002 | Lennon |
| 2002/0173971 A1 | 11/2002 | Stirpe et al. |
| 2003/0032409 A1 | 2/2003 | Hutcheson et al. |
| 2003/0033331 A1 | 2/2003 | Sena et al. |
| 2003/0149574 A1 | 8/2003 | Rudman |
| 2003/0191816 A1 | 10/2003 | Landress et al. |
| 2004/0030798 A1 | 2/2004 | Andersson et al. |
| 2004/0043758 A1 | 3/2004 | Sorvari et al. |
| 2004/0070602 A1 | 4/2004 | Kobuya et al. |
| 2004/0139025 A1 | 7/2004 | Coleman |
| 2004/0139047 A1 | 7/2004 | Rechsteiner |
| 2004/0209602 A1 | 10/2004 | Joyce et al. |
| 2004/0267880 A1 | 12/2004 | Patiejunas |
| 2005/0050043 A1 | 3/2005 | Pyhalammi et al. |
| 2005/0105552 A1 | 5/2005 | Osterling |
| 2005/0131727 A1 | 6/2005 | Sezan et al. |
| 2005/0151849 A1 | 7/2005 | Fitzhugh et al. |
| 2005/0159970 A1 | 7/2005 | Buyukkokten et al. |
| 2005/0165699 A1 | 7/2005 | Hahn-Carlson |
| 2005/0171955 A1 | 8/2005 | Hull et al. |
| 2005/0177385 A1 | 8/2005 | Hull et al. |
| 2005/0187786 A1 | 8/2005 | Tsai |
| 2005/0192025 A1 | 9/2005 | Kaplan |
| 2005/0203801 A1 | 9/2005 | Morgenstern et al. |
| 2005/0216295 A1 | 9/2005 | Abrahamsohn |
| 2005/0216300 A1 | 9/2005 | Appelman et al. |
| 2005/0219375 A1 | 10/2005 | Hasegawa et al. |
| 2006/0020631 A1* | 1/2006 | Cheong Wan et al. ..... 707/104.1 |
| 2006/0026067 A1 | 2/2006 | Nicholas et al. |
| 2006/0053058 A1 | 3/2006 | Hotchkiss et al. |
| 2006/0069616 A1 | 3/2006 | Bau |
| 2006/0069749 A1 | 3/2006 | Herz et al. |
| 2006/0085419 A1 | 4/2006 | Rosen |
| 2006/0089876 A1 | 4/2006 | Boys |
| 2006/0123053 A1 | 6/2006 | Scannell, Jr. |
| 2006/0173838 A1 | 8/2006 | Garg et al. |
| 2006/0184579 A1 | 8/2006 | Mills |
| 2006/0242139 A1 | 10/2006 | Butterfield et al. |
| 2006/0242178 A1 | 10/2006 | Butterfield et al. |
| 2006/0258368 A1 | 11/2006 | Granito et al. |
| 2007/0043766 A1 | 2/2007 | Nicholas et al. |
| 2007/0067104 A1 | 3/2007 | Mays |
| 2007/0086061 A1 | 4/2007 | Robbins |
| 2007/0161382 A1 | 7/2007 | Melinger et al. |
| 2007/0219708 A1 | 9/2007 | Brasche et al. |
| 2007/0282621 A1 | 12/2007 | Altman et al. |
| 2008/0010206 A1 | 1/2008 | Coleman |
| 2008/0120183 A1 | 5/2008 | Park |
| 2008/0147743 A1 | 6/2008 | Taylor et al. |
| 2008/0172632 A1 | 7/2008 | Stambaugh |
| 2008/0177706 A1* | 7/2008 | Yuen ................................ 707/3 |
| 2008/0270579 A1 | 10/2008 | Herz et al. |
| 2009/0073191 A1 | 3/2009 | Smith et al. |
| 2009/0106356 A1* | 4/2009 | Brase et al. ................... 709/203 |

FOREIGN PATENT DOCUMENTS

| | | |
|---|---|---|
| KR | 1020000054319 | 9/2000 |
| KR | 10-2000-0064105 | 11/2000 |
| KR | 1020030049173 | 6/2003 |
| WO | W02006/116196 | 11/2006 |
| WO | WO 2007070358 | 6/2007 |

OTHER PUBLICATIONS

Bharat, K. (Date Unknown). "SearchPad: Explicit Capture of Search Context to Support Web Search," located at <http://www9.org/w9cdrom/173/173.html >, last visited Aug. 1, 2007, 13 pages.

Budzik, J. et al. (2000). "User Interactions with Everyday Applications as Context for Just-in-Time Information Access," Proceeding of the 2000 Conference on Intelligent User Interfaces, eight pages.

Finkelstein, L. et al. (2001). "Placing Search in Context: The Concept Revisited," WWW/O, Hong Kong, May 2-5, 2001, pp. 406-414.

Freyne, J. et al. (2004). "Further Experiments on Collaborative Ranking in Community-Based Web Search," Artificial Intelligence Review, pp. 1-23.

Lieberman, H. (1995) "Letizia: An Agent that Assists Web Browsing," Proceedings of the Fourteenth International Joint Conference on Artificial Intelligence, Aug. 20-25, 1995, six pages.

Mitra, M. et al. (1998). "Improving Automatic Query Expansion," Proceedings of the AMC SIGIR, nine pages.

U.S. Appl. No. 12/407,690, filed Mar. 19, 2009; 50 pages.

U.S. Appl. No. 12/407,681, filed Mar. 19, 2009; 56 pages.

International Search Report PCT/US2008/088228 dated Sep. 30, 2009—2 pages.

Written Opinion PCT/US2008/088228 dated Sep. 30, 2009—5 pages.

U.S. Appl. No. 11/593,668, filed Nov. 6, 2006 for Naaman, et al.

U.S. Appl. No. 11/593,869, filed Nov. 6, 2006 for Naaman, et al.

"Gutenkarte" Book Catalog, 2006 MetaCarta, Inc., www.gutenkarte.org 11pgs.

Baron, N.S. et al. (Aug. 30, 2005). "Tethered or Mobile? Use of Away Messages in Instant Messaging by American College Students," Chapter 20.1 in Mobile Communication, Springer: London, England, 31:293-297.

Jones, C. et al. (2004). "Ad-Hoc Meeting System," Final Presentation from Project Group #7, SIMS 202, Fall 2004 Class, UC Berkley School of Information Management & Systems, located at <http://www2.sims.berkeley.edu/academics/courses/is202/f04/phone_project/Group7/>, last visited on Feb. 2, 2010, thirteen pages.

Manguy, L. et al. (2006). "iTour—Packing the World Into Your Mobile Device," Final Presentation from Project Group #6, SIMS 202, Fall 2004 Class, UC Berkley School of Information Management & Systems, located at <http://www2.sims.berkeley.edu/academics/courses/is202/f04/phone_project/Group6/index.h >. . . , last visited on Feb. 2, 2010, ten pages.

Mitnick, S. et al. (2004). "Pillbox," Final Presentation from Project Group #8, SIMS: 02: Fall 2004 Class, UC Berkley School of Information Management & Systems, located at <http://www2.sims.berkeley.edu/academics/courses/is202/f04/phone_project/Group8/about.p . . . ,> last visited on Feb. 2, 2010, seventeen pages.

Wooldridge, M. et al. (2005). "STALK. The Camera-phone Scavenger Hunt!" located at <http://www.stalk.com >, last visited on Dec. 28, 2009, two pages.

www.stalk.com (retrieved on Dec. 29, 2009) pp. 1-2.

Anonymous. (Date Unknown). "CommunityWalk—About," located at <http://www.communitywalk.com/about >, last visited on Mar. 3, 2008, one page.

Anonymous. (Date Unknown). "CommunityWalk Mapping Made Easy," located at <http://www.communitywalk.com/>, last visited on Mar. 3, 2008, one page.

Anonymous. (Date Unknown). "Google Earth User Guide" located at <http://earth.google.com/userguide/v4/>, last visited on Feb. 27, 2008, twelve pages.

Anonymous. (Date Unknown). "Google Earth—Wikipedia, the Free Encyclopedia," located at <http://en.wikipedia.org/wiki/Google_earth >, last visited on Mar. 3, 2008, fourteen pages.

Anonymous. (Date Unknown). "Google Earth User Guide—Using Image Overlays and 3D Models," located at <http://earth.google.com/userguide/v4/ug_imageoverlays.html >, nine pages.

Anonymous. (Date Unknown). "Google Maps," located at <http://en.wikipedia.org/wiki/Google_maps >, last visited on Feb. 27, 2008, eleven pages.

Anonymous. (Date Unknown). "Live Search Maps," located at <http://en.wikipedia.org/wiki/Windows_live_maps >, last visited on Mar. 3, 2008, six pages.

Anonymous. (Date Unknown). "WikiMapia," located at <http://en.wikipedia.org/wiki/WikiMapia >, last visited on Mar. 3, 2008, three pages.

Anonymous. (2007). "Ask.com Maps & Directions," located at <http://maps.ask.com/maps >, last visited on Mar. 3, 2008, one page.

Anonymous. (2007). "Wayfaring Follow You, Follow Me," located at <http://www.wayfaring.com/>, last visited on Mar. 3, 2008, three pages.

Anonymous. (2008). "Platial the People's Atlas," located at <www.platial.com >, last visited on Mar. 3, 2008, one page.

Anonymous. (2008). "Wikimpaia.org ," located at <http://wikimpaia.org/>, last visited on Mar. 3, 2008, one page.

Allen James F., "Maintaining Knowledge About Temporal Intervals", Communications of the ACM, Nov. 1983, vol. 26, No. 11 pp. 832-843; 12 pages.

Press Release, "QUALCOMM Conducts First Live Demonstration of FL Technology on a Wireless Handset", Qualcomm Inc., San Diego, Sep. 27, 2005; 3 pages.

MediaFlo, FLO Technology Overview, Qualcomm Inc. Copyright 2007; 24 pages.

Axup, Jeff et al., "Conceptualizing New Mobile Devices by Observing Gossip and Social Network Formation Amongst the Extremely Mobile" ,ITEE Technical Report #459, Dec. 19, 2005, pp. 1-71.

Conhaim, Wallys W., "Social networks: the Internet continues to evolve: where is the money in all this? That is what venture capitalists are asking. (Perspectives)", Information Today, 22, 9, 35(2), Oct. 2005, (pp. 1-5 of attached).

Davis, Marc et al., "From Context to Content: Leveraging Context to Infer Media Metadata", ACM Press, Oct. 10, 2004, pp. 1-8.

Kaasinen, E., "Behaviour & Information Technology", Taylor & Francis, vol. 24, No. 1, Jan./Feb. 2005, pp. 37-49, (Abstract only attached).

Konomi, Shin'ichi et al., "Supporting Colocated Interactions Using RFID and Social Network Displays", Pervasive Computing, Jul.-Sep. 2006 , vol. 5, No. 3, pp. 48-56 (pp. 1-4 of attached).

Lin, F. et al., "A unified framework for managing Web-based services.", Information Systems and e-Business Management, vol. 3, Oct. 2005, p. 299, (pp. 1-15 of attached).

Metz, Cade, "MySpace Nation", PC Magazine, Jun. 21, 2006, pp. 1-10 attached.

Perkowitz, Mike et al., "Utilizing Online Communities to Facilitate Physical World Interactions", The International Conference on Communities and Technologies, Sep. 19, 2003, Amsterdam, pp. 1 6.

Roush, Wade, "Social Machines", Continuous Computing Blog, Jul. 5, 2005, pp. 1-21.

Roush, Wade, "Social Machines", Technology Review, Aug. 2005, pp. 45-51.

Sheppard, Brett, "The Rights Stuff: The Integration of Enterprise Digital Rights Management Into an Enterprise Architecture", ECantent, vol. 29, No. 9, Nov. 2006, p. 38, 40-44, (pp. 1-7 of attached).

Voight, Joan et al., "Lessons for Today's Digital Market", ADWEEKCOM, Oct. 2, 2006, pp. 1-6.

"Companies add new communication features to photo sharing.", Digital Imaging Digest, Feb. 2006, pp. 1-2.

"DAVE.TV and Eye Music Network Empower Users to Create Their Own Music TV Channel on Their Sites With New IPTV Channel", www.davenw.com/2006, Sep. 13, 2006, pp. 1-2.

"Digital rights management: a primer: developing a user-friendly means of protecting content.(Profile)", Screen Digest, No. 420, p. 305, Sep. 2006, (pp. 1-9 of attached).

"Emerging Markets: What media 2.0 can offer advertisers.", Campaign, Oct. 27, 2006, p. 26, (pp. 1-5 of attached).

"Reality Digital Debuts Opus", www.lightreading.com. Sep. 25, 2006, pp. 1.

"Reality Digital—Making Media Move", www.realitydigital.com, Nov. 28, 2006, pp. 1-2.

International Search Report (PCT/US2007/084807) dated May 27, 2008; 3 pages.

International Preliminary Report on Patentability (PCT/US2007/084807) dated May 26, 2009; 5 pages.

International Search Report (PCT/US2010/026063) dated May 27, 2008; 3 pages.

Rekimoto, et al., "CyberCode: designing augmented reality environments with visual tags."Proceedings of DARE 2000 on Designing augmented reality environments, Elsinore, Denmark, pp. 1-11 Apr. 12-14, 2000.

"Semacode-URL Barcodes-practical ubiquitous computing", located at http://semacode.org visited on Apr. 13, 2007; 3 pages.

"Technical White Paper: Choosing the best 2D barcode format for mobile apps, "Semacode, Jul. 15, 2006; pp. 1-7 located at http://semacode.org/about/technical/whitepaper/best2_d_code.pdf.

Carbonell, J. et al. (Aug. 24-28, 1998). "The Use of MMR, Diversity-Based Reranking for Reordering Documents and Producing Summaries," SIGIR '98: Proceedings of the 21 S Annual International ACM SIGIR Conference on Research and Development in Information Retrieval: Melbourne, Australia W.B. Croft et al. eds., pp. 335-336.

Cooper, M. et al. (Nov. 2-8, 2003). "Temporal Event Clustering for Digital Photo Collections," MM'03 Berkeley, California, pp. 364-373.

Davis, M. et al. (Oct. 10-16, 2004). "From Context to Content: Leveraging Context to Infer Media Metadata," MM'04 New York, New York. 9 pages.

Davis, M. et al. "Mobile Media Metadata for Mobile Imaging." Jun. 27-30, 2004; 4 pages.

Davis, M. et al. "Using Context and Similarity for Face and Location Identification."10 pages.

Flickr. "Welcome to Flickr—Photo Sharing," located at <http://www.flickr.com > visited on Feb. 26, 2007, one page.

Gargi, U. (Aug. 7, 2003). "Consumer Media Capture: Time-Based Analysis and Event Clustering," Technical Report HPL-2003-165 HP Laboratories Palo Alto, pp. 1-15.

Goldberger, J. et al. The Hungarian Clustering Method, located at <http://scholar.googles.com/scholar?num=20&h1=en&lr=&9=cache:vbwsIsm1CisJ:www.openu.acil/Personal_sites/tamirtassa/Publications/hcm.pdf+goldberger+clustering+method+hungarian> visited on Mar. 1, 2007, twelve pages.

Graham, A. et al. (Jul. 13-17, 2002). Time as Essence for Photo Browsing Through Personal Digital Libraries, JCDL '02 Portland, Oregon. 11 pages.

Jaffe, A. et al. (May 23-26, 2006). "Generating Summaries for Large Collections of Geo-Referenced Photographs," WWW 2006 Edinburgh, Scotland. 2 pages.

Jaffe, A. et al. (Oct. 26-27, 2006). "Generating Summaries and Visualization for Large Collections of Geo-Referenced Photographs," MIR '06 Santa Barbara, California. 11 pages.

Joshi, D. et al. (Oct. 15-16, 2004). "The Story Picturing Engine: Finding Elite Images to Illustrate a Story Using Miitual Reinforcement," MIR '04 New York, New York. 9 pages.

Naaman, M. et al. (Nov. 2003). "From Where to What: Metadata Sharing for Digital Photographs with Geographic Coordinates," In on the Move to Meaningful Internet Systems 2003: Coop/S, DOA, and ODBASE R. Meersman et al. eds., pp. 196-217.

Naaman, M. et al. (Jun. 7-11, 2004). "Automatic Organization for Digital Photographs with Geographic Coordinates" Proceedings of the Fourth ACM/IEEE Joint Conference on Digital Libraries Global Reach and Diverse Impact: Tucson, Arizona, pp. 53-62.

Nair, R. et al. (Nov. 6-11, 2005). "Photo LOI: Browsing Multi-User Photo Collections," MM'05 Singapore, pp. 223-224.

O' Hare, N. et al. "Combination of Content Analysis and Context Features for Digital Photograph Retrieval." 7 pages.

Sarvas, R. et al. (Jun. 6-9, 2004). "Metadata Creation System for Mobile Images," MobiSys'04 Boiton, Massachusetts, pp. 36-48.

* cited by examiner

REGION AND DURATION UNIFORM RESOURCE IDENTIFIERS (URI) FOR MEDIA OBJECTS

BACKGROUND OF THE INVENTION

Communication networks, including computer networks, such as the Internet, increasingly rely on sequences of characters as addresses for identifying resources or information. An object on the Internet is assigned a Universal Resource Identifier (URI), which can be used to access the object. Typically, users transmit the URI to the server that contains the corresponding object, and then the server returns the corresponding object. A type of URI is a URL (Uniform Resource Locator). For example, a user desiring to view a particular Internet web page typically must enter a URI comprising a domain name and elements specifying a path or subpath under that domain name.

Due to the magnitude of the information already addressable using URIs and the efficiency with which the information can be retrieved using this addressing method, many applications are implemented to access objects using corresponding URIs to identify the object.

Currently, a URI may identify a media object, such as an image, video, or audio file. However, a URI may only identify the whole media object, and cannot identify a portion of the media object. For example, a user may want to share an interesting image of the last minute touchdown catch at a football game by using a URI. However, the user may really want to share that particular image because the image also shows the football receiver's foot out of bounds as he catches the ball. The user wanting to point out the football receiver's foot may need to provide additional information for a second user after sharing the whole image with a URI so that the second user will notice the portion of interest of the image.

Therefore, methods and systems for easily identifying portions of media objects is desired.

BRIEF SUMMARY OF THE INVENTION

In accordance with embodiments of the present invention, a method for providing a portion of a media object to a user is provided. The method includes receiving a URI associated with a media object. The URI indicates a portion of the media object. The method further includes determining the portion of the media object indicated by the URI. The method also includes providing the portion of the media object to a user.

Further, in accordance with embodiments of the present invention, a computer-readable medium encoded with executable instructions for a processor is provided. The instructions including instructions for providing a portion of a media object to a user. The instructions include instructions for receiving a URI associated with a media object. The URI indicates a portion of the media object. The instructions also include instructions for determining the portion of the media object indicated by the URI, and providing the portion of the media object to a user.

Moreover, in accordance with embodiments of the present invention, a system for providing a portion of a media object to a user is provided. The system includes a memory, logic for receiving a URI associated with a media object, and a processor. The processor is for determining the portion of the media object indicated by the URI, and providing the portion of the media object to a user.

Other features and aspects of the invention will become apparent from the following detailed description, taken in conjunction with the accompanying drawings which illustrate, by way of example, the features in accordance with embodiments of the invention. The summary is not intended to limit the scope of the invention.

In the following description, reference is made to the accompanying drawings which form a part thereof, and which illustrate several embodiments of the present invention. It is understood that other embodiments may be utilized and structural and operational changes may be made without departing from the scope of the present invention. The use of the same reference symbols in different drawings indicates similar or identical items.

DETAILED DESCRIPTION OF THE INVENTION

The following description is presented to enable any person of ordinary skill in the art to make and use the invention. Descriptions of specific materials, techniques, and applications are provided only as examples. Various modifications to the examples described herein will be readily apparent to those of ordinary skill in the art, and the general principles defined herein may be applied to other examples and applications without departing from the spirit and scope of the invention. Thus, the present invention is not intended to be limited to the examples described and shown.

A universal resource identifier (URI) typically includes a number of elements. For example, URIs specify a domain name consisting of a name chosen by the holder of the domain and a suffix indicating the top level domain under which the domain is established (e.g., .com or .org). In addition, paths, which may include paths and subpaths, that are identified by additional elements appended to the domain name may be formed under the domain. The elements specifying paths and subpaths can be arbitrarily assigned by the holder of the domain. A URL (Uniform Resource Locator) is a type of URI.

Figure 1:
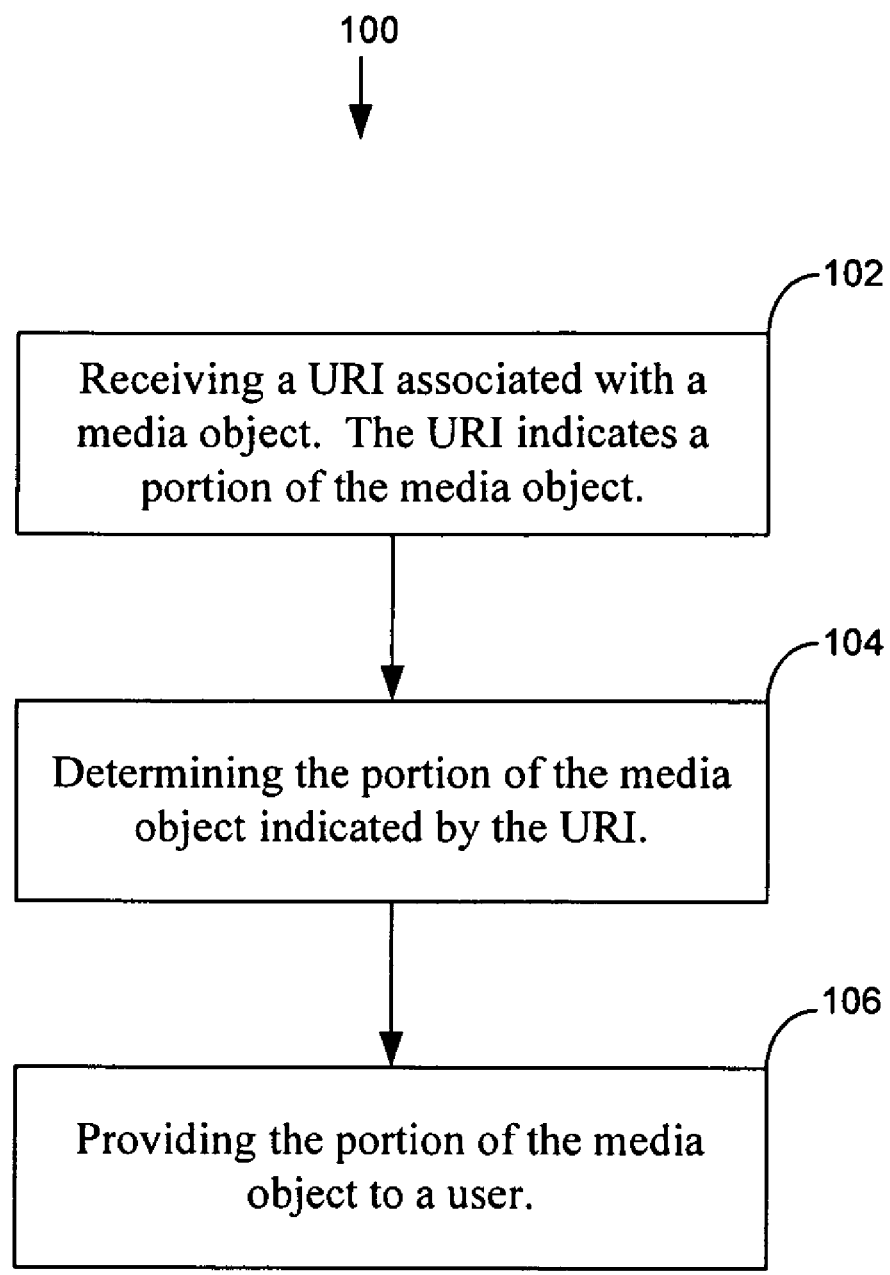
FIG. 1 illustrates a flowchart of a method for providing a portion of a media object to a user according to embodiments of the invention.

FIG. 1 illustrates a flowchart of a method 100 for providing a portion of a media object to a user according to embodiments of the invention. A URI associated with a media object is received 102. The received URI indicates a portion of the media object. The portion of the media object is determined based on the URI 104. A media object has dimensions. The strings of the URI associated with the media object may be mapped to a time and coordinates of the media object. The media object is retrieved and the portion requested by the URI is cropped or scanned to, for example, in order to provide to the user 106.

For example, an image is a two-dimensional object and a video is a three-dimensional object. By specifying the dimensions within the URI, a portion of the media object may be indicated by the URI.

In general, a media URI, or media URL, may have a format of: protocol://server/path/to/filename[innerpath]. The [innerpath] may be, for example, the following:
 /t1/(t1=start time for video-play until end)
 /t1/t2/(t1=start time; t2=stop time duration for video)
 /x1/y1/x2/y2/(x-y dimensions for cropping an image or video)
 /t1/x1/y1/x2/y2/(t1=start time; x-y dimensions for cropping a video)
 /t1/t2/x1/y1/x2/y2/(t1=start time; t2=stop time; x-y dimensions for cropping a video)

The time units and coordinate units may be specified according to other embodiments of the invention. Moreover, in some embodiments of the invention, mixed units may be used.

Delimiters in the [innerpath] may also be used to define portions of media objects. The [innerpath] may be the following, for example:
 /t1/(t1=start time for video-play until end)
 /t1-t2/(t1=start time; t2=stop time duration for video)
 /x1,y1/x2,y2/(x-y dimensions for cropping an image or video)
 /t1/x1.y1/x2.y2/(t1=start time; x-y dimensions for cropping a video)
 /t1/t2/x1-y1/x2-y2/(t1=start time; t2=stop time; x-y dimensions for cropping a video)

In other embodiments, the [innerpath] can be in the path and resolved via a rewrite rule. Further, the [innerpath] can be a fragment and handled by the browser.

For example, traditionally, the URL, http://example.com/movies/movie1.mov/2/10/100/100/200/200/, would serve the file http://example.com/movies/movie1.mov/2/10/100/100/200/200/default.file. However, a server side rewrite rule to the same URL (http://example.com/movies/movie1.mov/2/10/100/100/200/200/), would serve http://example.com/movies/movie1.mov.

To accomplish this on the client side, a fragment of #/2/10/100/100/200/200/ can be added to the base URL of http://example.com/movies/movie1.mov for a URL of http://example.com/movies/movie1.mov#/2/10/100/100/200/200/ (fragment).

Figure 2A:
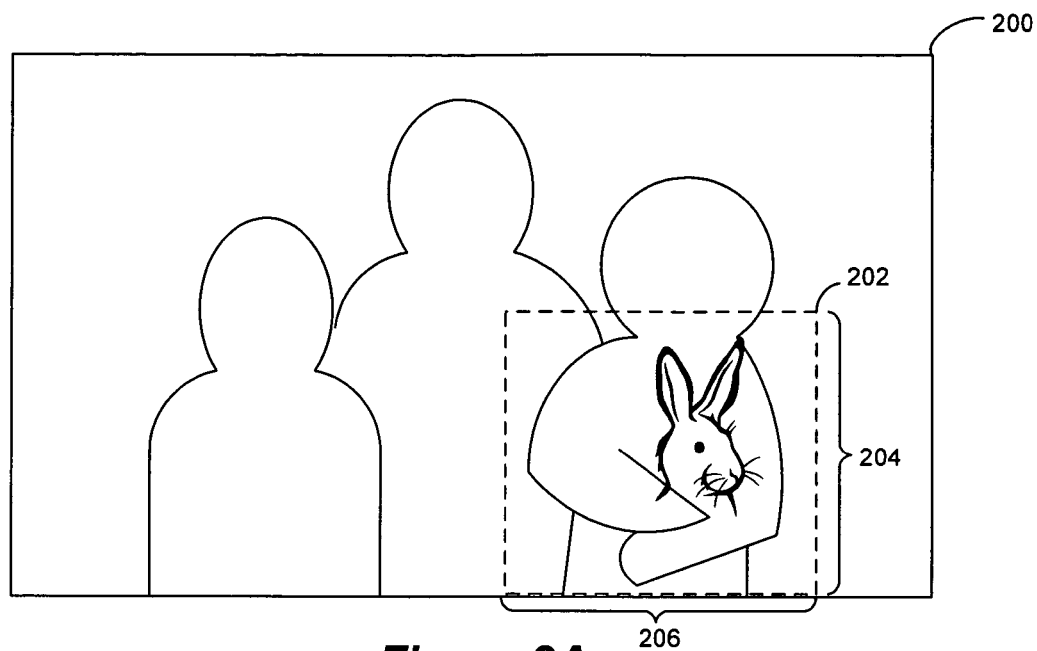
FIG. 2A illustrates an example of an image with a portion of the image for associating with a URL according to embodiments of the invention.

As described, the URL may define the crop box of an image to define an image portion. For example, FIG. 2A illustrates an example of an image with a portion of the image for associating with a URL according to embodiments of the invention. An image 200 is depicted. A user may want to only share the portion of the image showing the rabbit. The user would define an area for cropping the image so that only the portion of the image showing the rabbit is provided using a URL.

Figure 2B:
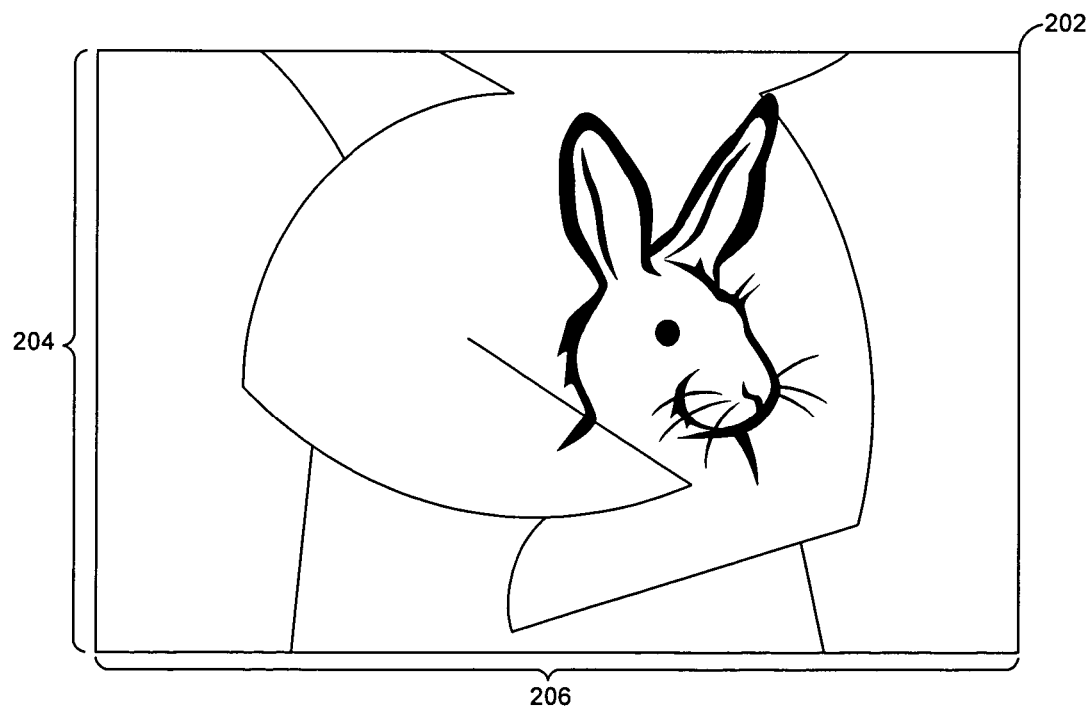
FIG. 2B illustrates the portion of the image of FIG. 2A associated with a URL according to embodiments of the invention.

Coordinates for x1 and x2 dimensions define an x-dimension 206 of the area 202. Similarly, y1 and y2 coordinates define a y-dimension 204 of area 202. A URL identifies area 202 and provides area 202 or image 200 to a user, as illustrated in FIG. 2B.

The media URL for providing the area 202 may be as follows, for example:
 http://example.com/pictures/photo.png#/10p/20p/60%/90%/

In other embodiments, if one point is defined for an image, the media URL for providing the area 202 may be as follows, for example:
 http://example.com/pictures/photo.png#/10/10/
 http://example.com/pictures/photo.png#/10/10/100%/100%/

Figure 3A:
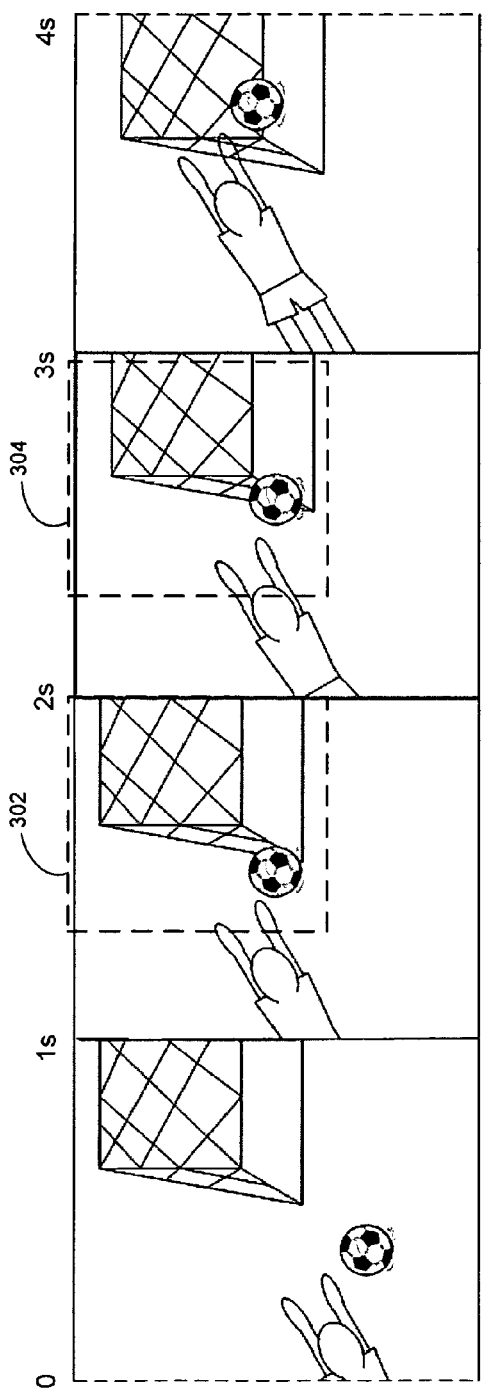
FIG. 3A illustrates an example of a video with a portion of the video for associating with a URL according to embodiments of the invention.

In other embodiments of the invention, a URL may be associated with a video. FIG. 3A illustrates an example of a video with a portion of the video for associating with a URL according to embodiments of the invention. Because a video has three dimensions, x and y, and time, the portion of the video may be defined in the URL.

A URL may be defined: http://example.com/movies/movie1.mov#/1s/3s/50/50/100/100/

Figure 3B:
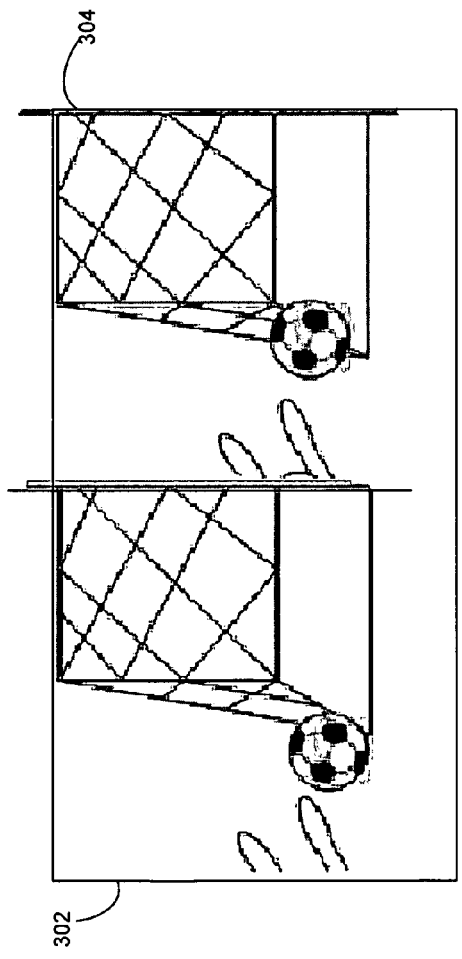
FIG. 3B illustrates the portion of the movie of FIG. 3A associated with a URL according to embodiments of the invention.

The x-y coordinates in the URL defines the areas 302 and 304. The start time and stop time are also specified in the URL. The portions determined by the URL are provided a user accessing the URL as illustrated in FIG. 3B.

Similar to images, mixed units may be used in a media URL associated with a video portion. Media URL examples may be as follows:
 http://example.com/movies/movie1.mov#/1m4s2f/
 http://example.com/movies/movie1.mov#/10f/2s/100p/100p/75%/75%/

Furthermore, in some embodiments, other identifiers can be used to clarify values. For example, a media URL may be generated as follows:
 http://example.com/movies/movie1.mov/start=2/stop=10/x1=100/y1=100/x2=200/y2=200/
 http://example.com/movies/movie1.mov/start=2f/stop=10m/x1=20p/y1=20p/x2=100%/y2=200p/

As illustrated in the following examples, r specifies a crop region/bounding box that may move over time, expressed as a bitmask (mov), vector animation (swf/svg), points over time (xml, csv) or a javascript function to be evaluated client side as the movie is played. In the former cases, the crop may be evaluated server side.

For example, the following URL refers to using a black & white bitmask to crop the source video:
 /t1/t2/r=http%3A%2F%2Fexample.com%2Fregion%2Fmask.mov As another example, the following URLs refer to vector animations for cropping the source video:
 /t1/t2/r=http%3A%2F%2Fexample.com%2Fregion%2Fmask.swf
 /t1/t2/r=http%3A%2F%2Fexample.com%2Fregion%2Fmask.svg As other examples, the following URLs refer to files which identify a set of time-stamped coordinates to crop the video:
 /t1/t2/r=http%3A%2F%2Fexample.com%2Fregion%2Fmask.xml
 /t1/t2/r=mask.xml
 /t1/t2/mask.csv In another example, the following URL identifies coordinate list inline the URL:
 /t1/t2/r=1(10,10,200,200),2(12,12,198,198),3(14, . . .

Figure 4A:
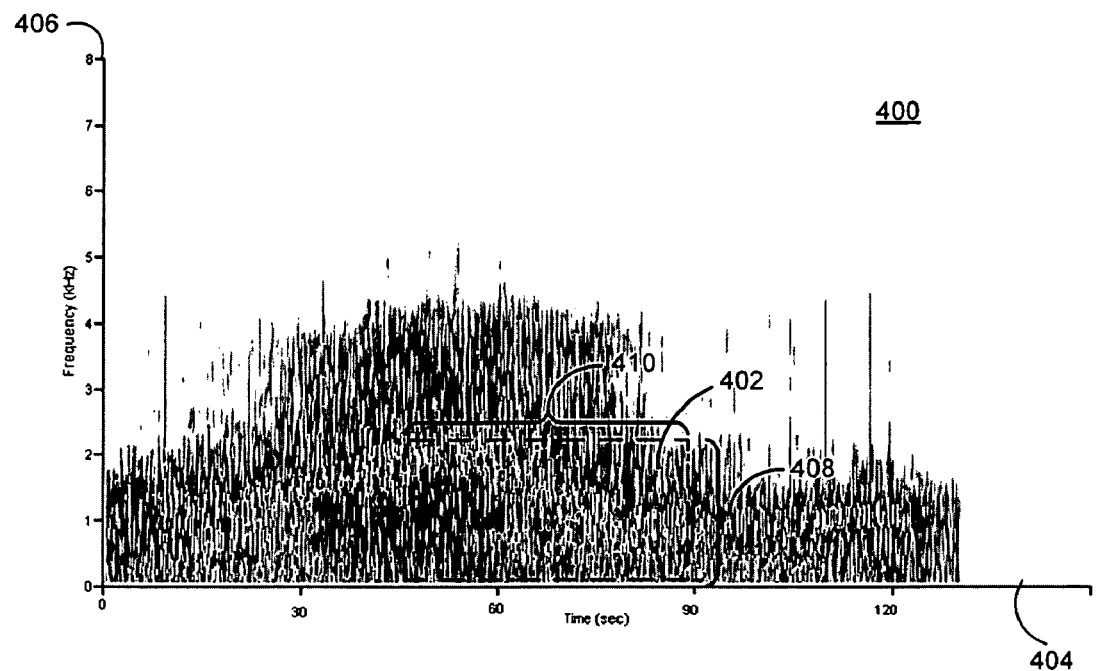
FIG. 4A illustrates an example of audio represented graphically as a spectrogram with a portion of the spectrogram for associating with a URL according to embodiments of the invention.
Figure 4B:
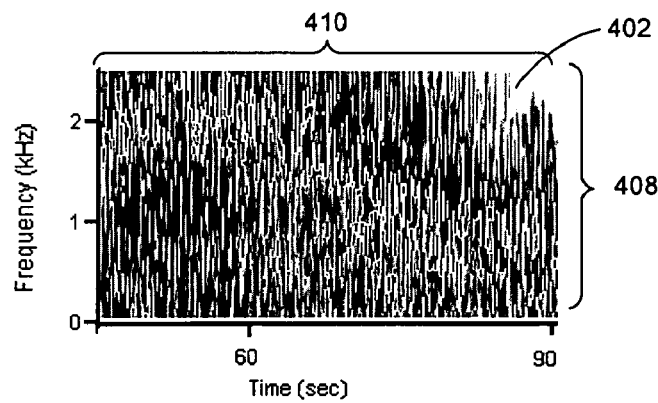
FIG. 4B illustrates the portion of the audio spectrogram of FIG. 4A associated with a URL according to embodiments of the invention.

In the following example, the URL indicates that a client side javascript function, which returns the pan and crop information, is to be evaluated on every second of playback:
 /t1/t2/js=javascript_cropregion_function In other embodiments, media URLs may be used to identify portions of audio files. FIGS. 4A and 4B illustrate an example of audio represented graphically as a spectrogram 400 with a portion of the spectrogram 402 associated with a URL according to embodiments of the invention. In this particular example, a start and stop time is defined and a frequency range. The time duration 410 is from 45 to 90 seconds. The frequencies from 0-2 kHz are included in the portion 402.

In other embodiments, in audio and video objects, layers, tracks, or channels may be accessed like a port on a server. For example, the media URL of http://example.com/movies/movie1.mov:v2/5s/10m/ would define a portion by pulling the second layer/track/channel out of the movie1.mov. The portion duration is from 5 seconds to 10 minutes and plays all audio channels.

In another example, the URL of http://example.com/movies/movie1.mov:v3a2/5s/10m/ defines a portion of movie1.mov. The portion provided in this example is the third layer/track/channel out of the movie1.mov, and the second audio track.

In another example, the URL of http://example.com/movies/movie1.mov:a1/5s/10m/ would specify a portion of just the first audio track of the movie1.mov. No video is included in the portion. This could also be included as "v0" in the URL: http://example.com/movies/movie1.mov:v0a1/5s/10m/

Similarly, the URL may specify no audio is included in the portion and just the first layer of movie1.mov is provided, such as in http://example.com/movies/movie1.mov:v1a0/5s/10m/.

As described before, the [innerpath] of the URL may be a fragment. For example, the following media URLs will identify equivalent portions of a media object:
    http://example.com/movies/movie1.mov/v3a2/5s/10m/
    http://example.com/movies/movie1.mov/:v3a2/5s/10m/
    http://example.com/movies/movie1.mov#:v3a2/5s/10m/
    http://example.com/movies/movie1.mov/::v3.a2/5s/10m/
    http://example.com/movies/movie1.mov/::3:2/5s/10m/

Figure 5:
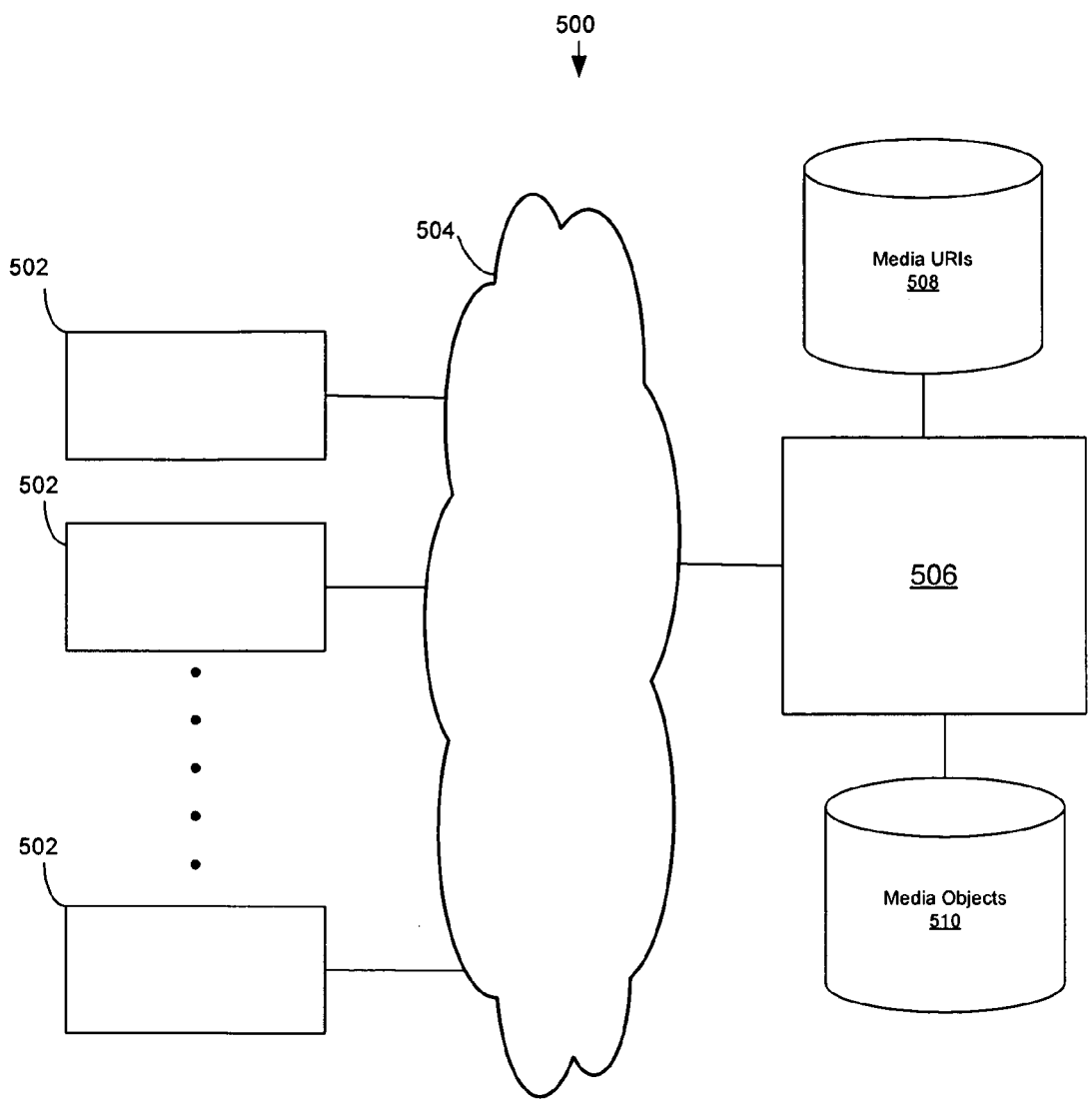
FIG. 5 illustrates a block diagram of a client/server system according to embodiments of the invention.

FIG. 5 illustrates a block diagram of a client/server system 500 according to embodiments of the invention. Clients 502 are connected to server 506 via the Internet 504. The server 506 is associated with a media URI memory 508 for storing URIs and URI formats. The server 506 is also associated with a media objects memory for storing media objects that a URI may point to. The server 506 may receive an indication of a portion of a media object. The URIs may be evaluated at the server 506 and provided to clients 502.

While aspects of the invention, including the above described systems and methods, are described in terms of particular embodiments and illustrative figures, those of ordinary skill in the art will recognize that the invention is not limited to the embodiments or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic, and/or an appropriate combination thereof, as would be recognized by one skilled in the art to carry out the recited functions.) Software and firmware can be stored on computer-readable media. Some other processes can be implemented using analog circuitry, as is well known to one of ordinary skill in the art. Additionally, memory or other storage, as well as communication components, may be employed in embodiments of the invention.

Figure 6:
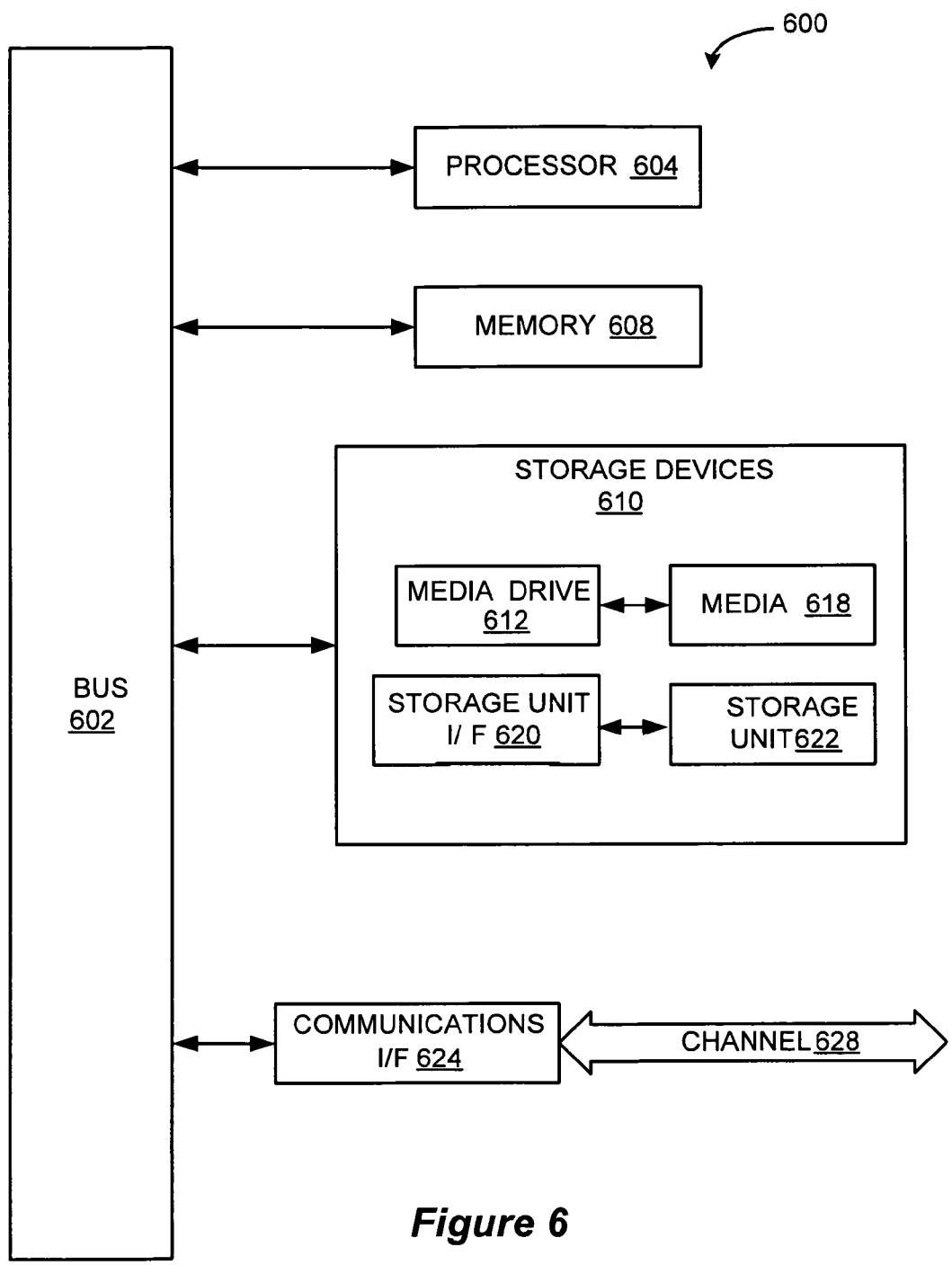
FIG. 6 illustrates a block diagram of a computing system according to embodiments of the invention.

FIG. 6 illustrates an exemplary computing system 600 that may be employed to implement processing functionality for various aspects of the invention (e.g., as a server device, client device, database, presence platform, combinations thereof, and so on). Those skilled in the relevant art will also recognize how to implement the invention using other computer systems or architectures. Computing system 600 may represent, for example, a desktop, mainframe, server, client, or any other type of special or general purpose computing device as may be desirable or appropriate for a given application or environment. Computing system 600 can include one or more processors, such as a processor 604. Processor 604 can be implemented using a general or special purpose processing engine such as, for example, a microprocessor, microcontroller or other control logic. In this example, processor 604 is connected to a bus 602 or other communication medium.

Computing system 600 can also include a main memory 608, for example random access memory (RAM) or other dynamic memory, for storing information and instructions to be executed by processor 604. Main memory 608 also may be used for storing temporary variables or other intermediate information during execution of instructions to be executed by processor 604. Computing system 600 may likewise include a read only memory ("ROM") or other static storage device coupled to bus 602 for storing static information and instructions for processor 604.

The computing system 600 may also include information storage mechanism 610, which may include, for example, a media drive 612 and a removable storage interface 620. The media drive 612 may include a drive or other mechanism to support fixed or removable storage media, such as a hard disk drive, a floppy disk drive, a magnetic tape drive, an optical disk drive, a CD or DVD drive (R or RW), or other removable or fixed media drive. Storage media 618 may include, for example, a hard disk, floppy disk, magnetic tape, optical disk, CD or DVD, or other fixed or removable medium that is read by and written to by media drive 614. As these examples illustrate, the storage media 618 may include a computer-readable storage medium having stored therein particular computer software or data.

In alternative embodiments, information storage mechanism 610 may include other similar instrumentalities for allowing computer programs or other instructions or data to be loaded into computing system 600. Such instrumentalities may include, for example, a removable storage unit 622 and an interface 620, such as a program cartridge and cartridge interface, a removable memory (for example, a flash memory or other removable memory module) and memory slot, and other removable storage units 622 and interfaces 620 that allow software and data to be transferred from the removable storage unit 618 to computing system 600.

Computing system 600 can also include a communications interface 624. Communications interface 624 can be used to allow software and data to be transferred between computing system 600 and external devices. Examples of communications interface 624 can include a modem, a network interface (such as an Ethernet or other NIC card), a communications port (such as for example, a USB port), a PCMCIA slot and card, etc. Software and data transferred via communications interface 624 are in the form of signals which can be electronic, electromagnetic, optical, or other signals capable of being received by communications interface 624. These signals are provided to communications interface 624 via a channel 628. This channel 628 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms "computer program product" and "computer-readable medium" may be used generally to refer to media such as, for example, memory 608, storage device 618, storage unit 622, or signal(s) on channel 628. These and other forms of computer-readable media may be involved in providing one or more sequences of one or more instructions to processor 604 for execution. Such instructions, generally referred to as "computer program code" (which may be grouped in the form of computer programs or other groupings), when executed, enable the computing system 600 to perform features or functions of embodiments of the present invention.

In an embodiment where the elements are implemented using software, the software may be stored in a computer-readable medium and loaded into computing system 600 using, for example, removable storage drive 614, drive 612 or communications interface 624. The control logic (in this example, software instructions or computer program code), when executed by the processor 604, causes the processor 604 to perform the functions of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention. Moreover, aspects of the invention describe in connection with an embodiment may stand alone as an invention.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

Moreover, it will be appreciated that various modifications and alterations may be made by those skilled in the art without departing from the spirit and scope of the invention. The invention is not to be limited by the foregoing illustrative details, but is to be defined according to the claims.

What is claimed is:

1. A method comprising:
receiving, over a network, a Uniform Resource Identifier (URI) associated with a media object, the URI comprising a server path to the media object and an inner path, the inner path comprising a specification of a portion of a media object, such that the inner path further comprises a crop region bounding box that moves over time;
determining, using a computing device, the portion of the media object using the specification; and
providing, over the network, the portion of the media object and an indication of the portion of the media object to a user.

2. The method of claim 1 such that the crop region bounding box comprises a black and white bitmask.

3. The method of claim 1 such that the crop region bounding box comprises a vector animation.

4. The method of claim 1 such that the portion and the indication is provided to a user device and the step of providing the portion of the media object further comprises causing the user device to display the portion of the media object to the user, the crop region bounding box comprising a javascript such that the user device is caused to execute the javascript when the portion is displayed on the user device.

5. A method comprising:
receiving, over a network, a Uniform Resource Identifier (URI) associated with a media object, the URI comprising a server path to the media object and an inner path, the inner path comprising a specification of a portion of a media object, such that the specification of a portion includes a frequency range;
determining, using a computing device, the portion of the media object using the specification; and
providing, over the network, the portion of the media object and an indication of the portion of the media object to a user.

6. A non-transitory computer-readable storage medium for tangibly storing thereon computer readable instructions for a method comprising:
receiving, over a network, a Uniform Resource Identifier (URI) associated with a media object, the URI comprising a server path to the media object and an inner path, the inner path comprising a specification of a portion of a media object, such that the inner path further comprises a crop region bounding box that moves over time;
determining the portion of the media object using the specification; and
providing, over the network, the portion of the media object and an indication of the portion of the media object to a user.

7. The non-transitory computer-readable storage medium of claim 6 such that the crop region bounding box comprises a black and white bitmask.

8. The non-transitory computer-readable storage medium of claim 6 such that the crop region bounding box comprises a vector animation.

9. The non-transitory computer-readable storage medium of claim 6 such that the portion and the indication is provided to a user device and the step of providing the portion of the media object further comprises causing the user device to display the portion of the media object to the user, the crop region bounding box comprising a javascript such that the user device is caused to execute the javascript when the portion is displayed on the user device.

10. A non-transitory computer-readable storage medium for tangibly storing thereon computer readable instructions for a method comprising:
receiving, over a network, a Uniform Resource Identifier (URI) associated with a media object, the URI comprising a server path to the media object and an inner path, the inner path comprising a specification of a portion of a media object, such that the specification of a portion includes a frequency range;
determining the portion of the media object using the specification; and providing, over the network, the portion of the media object and an indication of the portion of the media object to a user.

11. A system comprising:
a processor;
a storage medium for tangibly storing thereon program logic for execution by the processor, the program logic comprising:
   logic executed by the processor for receiving, over a network, a Uniform Resource Identifier (URI) associated with a media object, the URI comprising a server path to the media object and an inner path, the inner path comprising a specification of a portion of a media object, such that the inner path further comprises a crop region bounding box that moves over time;
   logic executed by the processor for determining the portion of the media object using the specification; and
   logic executed by the processor for providing, over the network, the portion of the media object and an indication of the portion of the media object to a user.

12. The system of claim 11 such that the crop region bounding box comprises a black and white bitmask.

13. The system of claim 11 such that the crop region bounding box comprises a vector animation.

14. The system of claim 11 such that the portion and the indication is provided to a user device and the step of providing the portion of the media object further comprises causing the user device to display the portion of the media object to the user, the crop region bounding box comprising a javascript such that the user device is caused to execute the javascript when the portion is displayed on the user device.

15. A system comprising:
a processor;
a storage medium for tangibly storing thereon program logic for execution by the processor, the program logic comprising:
   logic executed by the processor for receiving, over a network, a Uniform Resource Identifier (URI) associated with a media object, the URI comprising a server path to the media object and an inner path, the inner path comprising a specification of a portion of a media object, such that the specification of a portion includes a frequency range;
   logic executed by the processor for determining the portion of the media object using the specification; and
   logic executed by the processor for providing, over the network, the portion of the media object and an indication of the portion of the media object to a user.

* * * * *